(12) United States Patent
Mirfakhraei

(10) Patent No.: US 6,324,232 B1
(45) Date of Patent: *Nov. 27, 2001

(54) ADAPTIVE DC-COMPENSATION

(75) Inventor: Khashayar Mirfakhraei, Fremont, CA (US)

(73) Assignee: PC-Tel, Inc., Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,719

(22) Filed: Jan. 15, 1998

(51) Int. Cl.$^7$ .............................. H04B 1/10; H04B 14/04
(52) U.S. Cl. ............................... 375/350; 375/242
(58) Field of Search ..................... 375/350, 222, 375/219, 242, 287, 344; 708/300, 323

(56) References Cited

U.S. PATENT DOCUMENTS

| | | | |
|---|---|---|---|
| 5,272,730 | * 12/1993 | Clark | 375/376 |
| 5,406,560 | * 4/1995 | Kondo et al. | 370/465 |
| 5,561,687 | * 10/1996 | Turner | 375/233 |
| 5,602,602 | * 2/1997 | Hulyalkar | 348/607 |
| 5,604,769 | * 2/1997 | Wang | 375/229 |
| 5,812,333 | * 9/1998 | Colineau | 360/25 |
| 5,852,630 | * 12/1998 | Langberg et al. | 375/219 |

FOREIGN PATENT DOCUMENTS

0704968A1   9/1995 (EP) .............................. H03H/21/00

OTHER PUBLICATIONS

Djen, Wing Shing et al., "Performance Improvement Methods for Dect and Other Non–coherent GMSK Systems," *Proceedings of the Vehicular Technology Society Conference*, vol. Conf. 42, pp. 97–100.

Bergmans, *Digital Baseband Transmission and Recording*, Kluwer Academic Publishers, Dordrecht, The Netherlands, pp. 424–437 (1997).

Haykin, *Adaptive Filter Theory, Prentice Hall*, Englewood Cliffs, NJ, pp. 216–217, 237, 34–36 (1985).

Waldhauer, "Quantized Feedback in an Experimental 280–Mb/s Digital Repeater for Coaxial Transmission", IEEE Transactions on Communications, vol. COM–22, No. 1, pp. 1–5 (Jan., 1974).

"Baseline Wander and Spectral Shaping", Hayes Microcomputer Products, Inc., ITU–Telecommunications Standardization Sector, Study Group 16–Question 23, 5 pages (Jun., 1997).

* cited by examiner

Primary Examiner—Don N. Vo
Assistant Examiner—Khai Tran
(74) Attorney, Agent, or Firm—Skjerven Morrill MacPherson LLP

(57) ABSTRACT

A receiver compensates for DC or baseline wander using a multi-tap filter to predict the shift in each sample of a received signal. The multi-tap filter is adaptive through coefficients updated during operation of the receiver. For each prediction, filter coefficients of the multi-tap filter change according to the error in the preceding prediction so that the changed coefficients would have provided a better prediction of the baseline shift for the preceding sample. The changed filter coefficients generally provide better future predictions.

15 Claims, 3 Drawing Sheets

ADAPTIVE DC-COMPENSATION

BACKGROUND

1. Field of the Invention

This invention relates to processes that reduce the effect of baseline wander and intersymbol interference in signals such as those used in communications.

2. Description of Related Art

A modem or other transmitter using pulse code modulation (PCM) to transmit data generates a signal that includes a series of pulses representing a series of symbols. Each pulse has an amplitude that indicates a value for a corresponding symbol. A receiver determines the symbol values by measuring the amplitudes of the pulses relative to a baseline voltage. However, when the pulses are sent through a channel that blocks or attenuates DC or low frequency signal components, the level of each pulse sags toward zero during the duration of the pulse. This sag affects the level of the next pulse. In particular, the received amplitude of the next pulse is larger if the next pulse is of opposite polarity from the preceding pulse, and the amplitude of the next pulse is smaller if the next pulse is of the same polarity as the preceding pulse. This inter-symbol interference changes the baseline for accurate determination of pulse amplitudes and is commonly referred to as baseline wander. Similar baseline wander occurs in signals using other modulation protocols common to many standard communication signals. Baseline wander can cause a receiver to incorrectly identify symbol values associated with a portion of a received signal.

A transmitter can reduce baseline wander by reducing or avoiding the low frequency components in the transmitted signal. However, avoiding low frequency components reduces the bandwidth available for information transmission. Alternatively, a receiver can compensate for baseline wander using a feedback mechanism similar to the one described in "Quantized Feedback in an Experimental 280Mb/s Digital Repeater for Coaxial Transmission," by F. D. Waldhauer, IEEE Trans. Communications, Vol. COM-22, No. 1, January 1974, pp 1–5. These feedback mechanisms commonly assume a particular model for the characteristics of the transmission channel and have little or no ability to adjust for actual performance of the channel. Thus, improved systems for handling baseline wander are needed.

SUMMARY

In accordance with the invention, a receiver compensates for baseline wander using a multi-tap filter to predict the amount of baseline shift in each sample of a received signal. The multi-tap filter is adaptive through coefficients that are updated during operation of the receiver. Generally, the coefficients converge to values that minimize differences between values extracted from a compensated signal and allowed symbol values for the signal according to the signal's protocol.

One particular system that compensates for baseline shift includes an adder that adds a predicted baseline shift to an uncorrected sample to generate a corrected sample. A slicer then compares values extracted from the corrected samples to values allowed for the symbols according to the signal protocol of the transmitted signal. The difference between an extracted value and the nearest allowed value indicates an error in the prediction or equivalently the amount of shift the prediction did not correct. A multi-tap finite impulse response (FIR) filter and an integrator predict the baseline shift for the next sample based on preceding predicted baseline shifts and the preceding errors in the predicted shifts. Additionally, for each prediction, filter coefficients of the multi-tap FIR filter can be changed according to the error in the preceding prediction so that the changed coefficients would have provided a better prediction of the baseline shift for the preceding sample. The changed filter coefficients generally provide better fixture predictions. If the channel characteristics are constant, the filter coefficients tend to converge to values that are adapted for the channel. If the channel changes, the filter coefficients adapt to the changes. The number of taps in the multi-tap filter is selected according to the desired correction of intersymbol interference in the received signal and the available computing power for signal conditioning.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an embodiment of the invention, a receiver uses an adaptive multi-tap filter when predicting a shift in the baseline of a received signal. The predicted shift is then added to the received signal to compensate for baseline or DC wander in the received signal.

Figure 1:
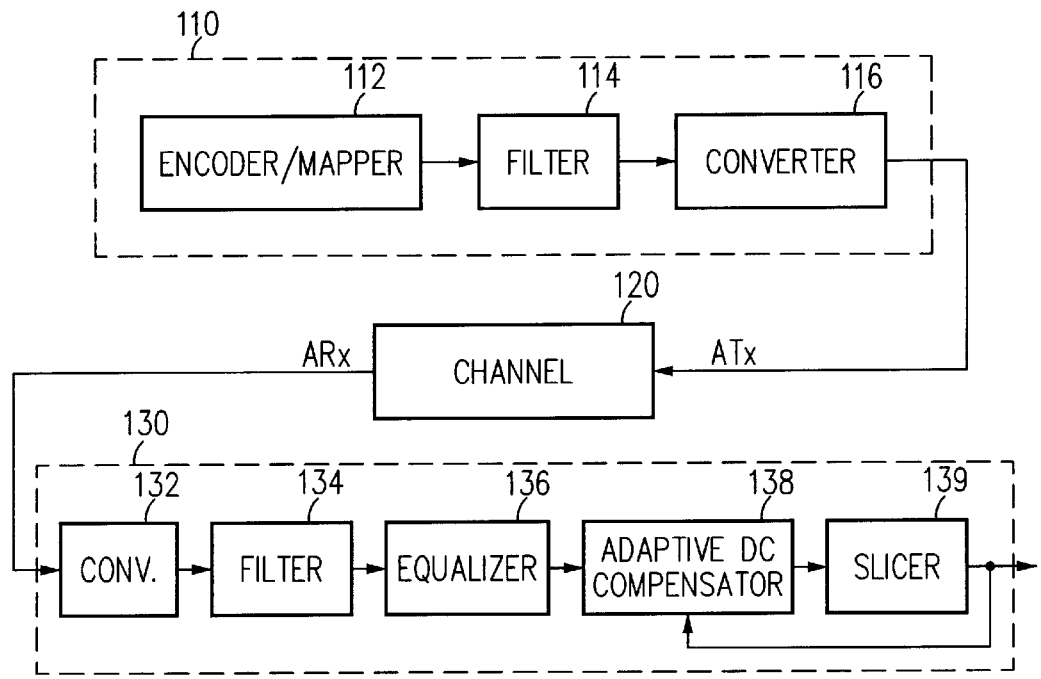
FIG. 1 illustrates a transmission to a receiver using adaptive DC compensation in accordance with an embodiment of the invention.

FIG. 1 illustrates portions of a communication system in which a transmitter 110 transmits data through a channel 120 to a receiver 130. In the embodiment shown, transmitter 110 is a portion of a modem and contains an encoder 112, a filter 114, and a converter 116 that together generate a transmitted analog signal ATx. In operation, encoder 112 receives the data to be transmitted and maps the data into co-ordinates of symbols defined by a modem protocol. Each symbol co-ordinate has a corresponding unique function that a modulation scheme defines for the symbol co-ordinate. For example, for a pulse amplitude modulated (PAM) signal, each symbol value has a single co-ordinate and a function with a unique constant value. Filter 114 receives symbol co-ordinates from mapper 112 at a symbol (or baud) rate and upsamples and the co-ordinates to create a series at the sampling frequency of converter 116. Filter 114 also shapes the series according to the characteristics of channel 120 for optimal reception at receiver 130. Converter 116 sequentially samples the functions associated with co-ordinates in the series from filter 114 and generates analog signal ATx according to the samples. The sampling frequency of converter 116 is typically higher than the output symbol rate from encoder 112 so that converter 116 samples one or more functions multiple times for each symbol.

Channel 120 connects transmitter 110 to receiver 130 with an AC coupling or a coupling that otherwise strongly attenuates DC and low frequency components of a transmitted signal. For modem communication, channel 120 includes a conventional telephone connection. Such channels block or attenuate any DC or low frequency components of signal ATx so that receiver 130 receives an analog signal ARx that differs from transmitted signal ATx. Channel 120 may also include other imperfections that change transmitted signal ATx.

Receiver 130 which is part of another modem includes a converter 132, a filter 134, an equalizer 136, an adaptive DC compensator 138, and a slicer 139. Converter 132, filter 134, and equalizer 136 perform initial signal conditioning. In particular, converter 132 converts analog signal ARx to a series of digital samples Rx(n) where n is a time index. Samples Rx(n) can result from direct sampling of signal ARx or from interpolation between samples directly taken. Filter 134 is a digital band pass filter that maximizes the energy at the transmitted frequencies and removes high frequency components which may be artifacts of channel 120 or converter 132. Equalizer 136 compensates for alterations to transmitted signal ATx due to channel impairments. As a result, equalizer 136 at least partially compensates for attenuation of low frequency components and baseline wander. Each sample Rx'(n) from equalizer 136 is equal to a sample Tx(n) of the transmitted signal ATx minus some baseline shift S(n). Compensator 138 adds a predicted shift S'(n) to an associated sample Rx'(n) to compensate for the actual shift S(n).

In an exemplary embodiment of the invention, transmitter 110 and receiver 120 implement pulse amplitude modulation (PAM) signaling according to the V.PCM protocol. The V.PCM protocol defines 208 symbols, each symbol corresponding to a fixed voltage level relative to a baseline. The symbol rate for the convention is 4000 bauds/s so that a sampling rate of about 9600 Hz is sufficient for converter 116. Converter 132 upsamples signal ARx to a frequency of about 16 kHz to provide multiple samples Rx(n) for each symbol.

Figure 2:
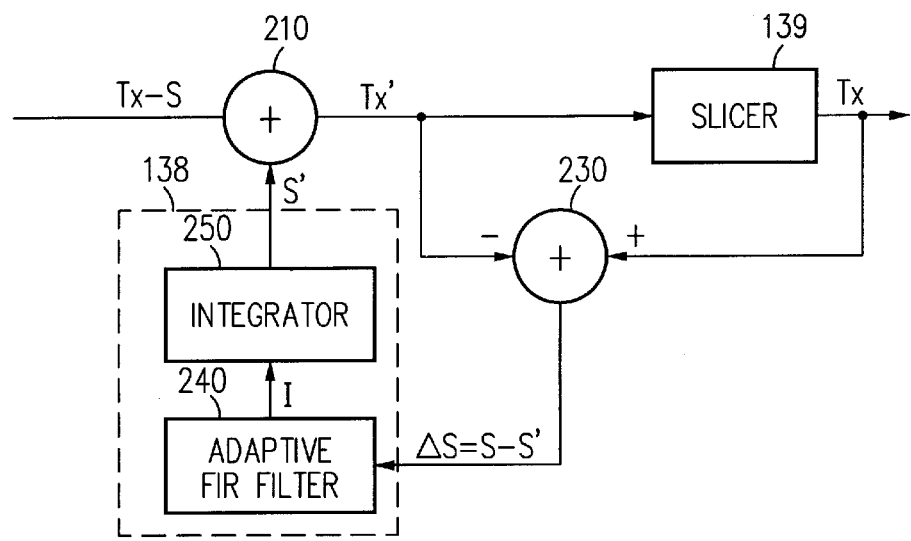
FIG. 2 shows a block diagram of an adaptive DC compensation unit in accordance with an embodiment of the invention, for use on a received signal using pulse amplitude modulation.

FIG. 2 shows an exemplary embodiment of compensator 138 suitable for compensating for baseline shift in a PAM signal. Compensation unit 138 is connected to slicer 139 and includes an adaptive FIR (finite impulse response) filter 240 and an integrator 250 which are connected to adders 210 and 230. In operation, adder 210 adds a predicted shift S'(n) to an associated sample Rx'(n) to generate a corrected level Tx'(n). The number of possible discrete values for samples Rx(n) and corrected levels Tx'(n) exceed the number of symbol values allowed by the PAM protocol. For example, levels Tx'(n) may be 16-bit values for a protocol having 208 allowed symbol levels. Slicer 139 converts corrected level Tx'(n) to a symbol level Tx(n) that is one of the 208 complying with the protocol. The differences between symbol level Tx(n) and sample Rx'(n) is the actual baseline shift S(n). If the predicted shift S'(n) is precisely equal to actual shift S(n), the corrected level Tx'(n) is equal to corresponding symbol level Tx(n). Adder 230 determines the difference between associated levels Tx(n) and Tx'(n) which indicates an amount $\Delta S(n)$ of uncorrected baseline shift or equivalently the error in predicted shift S'(n).

Adaptive FIR filter 240 and integrator 250 combined determine predicted shift S'(n) from previous predictions S'(n−1), S'(n−2), . . . and uncorrected shifts $\Delta S(n-1)$, $\Delta S(n-2)$, . . . In particular, adaptive filter 240 generates an integrand I(n) using an N-tap filter operating on the past uncorrected shifts $\Delta S(n-1)$ to $\Delta S(n-N)$, and integrator 250 generates predicted shift S'(n) from integrand I(n) and one or more of the previous predictions S'(n−1), S'(n−2), . . . . Equation 1 shows the N-tap filter operation of FIR filter 240.

$$I(n) = \sum_{i=1}^{N} c_i(n) \cdot \Delta S(n-i) \qquad \text{Equation 1:}$$

In Equation 1, i is a tap index that ranges from 1 to N, and $c_i(n)$ is a filter coefficient corresponding to tap index i and a time index n.

Integrator 250 combines integrand I(n) from filter 240 with M previously predicted shifts S'(n−1) . . . S'(n−M), for example, as indicated in Equation 2.

$$S'(n)=F(S'(n-1), \ldots ,S'(n-M))+I(n) \qquad \text{Equation 2:}$$

Equation 2 is appropriate for an M-pole infinite impulse response (IIR) integrator. Equation 2(a) is a special case of Equation 2 where a single-pole integrator determines the predicted shift S'(n) from the immediately preceding prediction S'(n−1) and integrand I(n).

$$S'(n)=\alpha S'(n-1)+I(n) \qquad \text{Equation 2(a):}$$

In Equation 2(a), $\alpha$ is a constant on the order of 1, and in an exemplary embodiment of the invention, $\alpha$ is 0.95. Alternatively, any desired integration can be employed. Adder 210 adds the predicted shift S'(n) from integrator 250 to uncorrected sample Rx'(n).

Filter 240 is adaptive in that filter coefficients $c_i(n)$ change according to the amount $\Delta S(n)$ of baseline shift the predicted shift S'(n) fails to correct. Generally, for filter 240 to adapt, coefficients $c_i(n)$ change over time to increase (or decrease) the size of predicted shifts S'(n) when predicted shifts S'(n) are generally less (or greater) than the actual shifts S(n). A variety of interative methods for determining changes in the coefficient $c_i(n)$ based on measured uncorrected shift $\Delta S(n)$ provide the appropriate feedback. However, in the exemplary embodiment, coefficients $c_i(n+1)$ are determined according to Equation 3.

$$c_i(n+1)=c_i(n)+\mu \cdot \Delta S(n) \cdot \Delta S(n-i) \qquad \text{Equation 3:}$$

In Equation 3, $\mu$ is a constant that controls the speed at which filter coefficients $c_i(n)$ adapt to the channel imperfections. Adaptive Filter Theory, Prentice Hall, 1985 by S. Haykin, further describes adapting filter coefficients and is incorporated by reference herein in its entirety. For each level Tx'(n) through slicer 139, coefficients of adaptive filter 240 change. For a steady state in channel 120, coefficients $c_i$ converge toward and oscillate about best values. Constant $\mu$ determines how quickly coefficients ci converge and the amplitude of the oscillations about the best values.

Adaptive DC compensator 138 can be implemented in specialized hardware that performs the functions of components 240 and 250 or alternatively in software. Such software can be stored in computer readable storage such as on a floppy disk, hard disk, CD-ROM, or DVD disk or in memory such as RAM or ROM. A digital signal processor in a conventional modem or a the central processor of a host computer containing a host signal processing modem can execute the software that compensates for DC or baseline wander in a received signal. Table A in the appendix contains a listing of a MatLab program implementing adaptive DC compensation in accordance with one embodiment of the invention.

Table 1 shows the results of a simulation of compensation unit 138 using different size filters in the exemplary embodiment of the invention.

TABLE 1

Interference Reduction for Different Size Filters

| No. of Taps | Reduction in Baseline Wander (db) |
|---|---|
| 0 | 9 |
| 1 | 17 |
| 3 | 20.4 |
| 10 | 21.3 |
| 20 | 23 |

In Table 1, zero taps is the case without filtering where integrator 250 receives the uncorrected shift $\Delta S(n)$ directly from adder 230. With one tap, uncorrected shift $\Delta S(n)$ is multiplied by a coefficient (or adaptive multiplier) that can change to adapt to channel imperfections. For Table 1, the data rate is 48 kbits/s for the V.PCM protocol. As shown, the multi-tap filters provide reductions of several decibels in power levels for wander over no filtering (zero taps) or use of an adaptive multiplier (one tap).

For V.PCM and other bandwidth limited signal protocols, the reduction in baseline wander depends on the data rate (or the symbol rate) of the transmitted signal since signals with different data rates have different frequency spectrums. Distortion and baseline wander depend on the DC and low frequency components of the transmitted signal. Table 2 illustrates the performance of a 3-tap adaptive filter at reducing intersymbol interference for a series of different bit rates using the V.PCM protocol.

TABLE 2

Interference Reduction at Different Bit Rates

| Bit Rate (kbits/s) | Reduction in Baseline Wander (db) |
| --- | --- |
| 40 | 15 |
| 42 | 15 |
| 48 | 20 |
| 52 | 22 |
| 54 | 21.5 |
| 56 | 21.5 |

At higher bit rates, intersymbol interference increases which makes compensation more important. As shown in Table 2, adaptive DC compensation in accordance with the invention provides greater decibel reduction in baseline wander at the higher bit rates.

Figure 3:
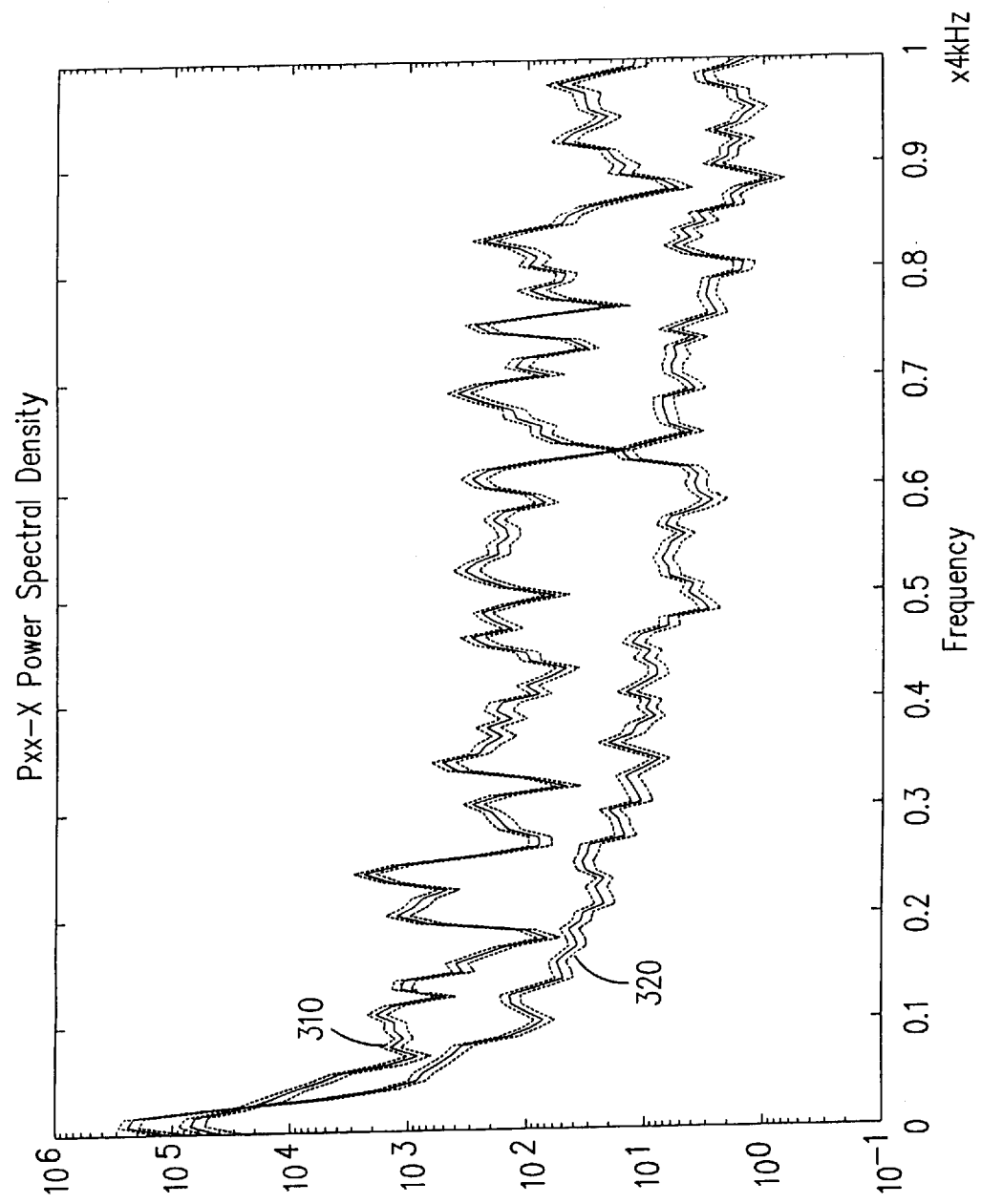
FIGS. 3 and 4 respectively show power spectral densities for typical signals before and after adaptive DC compensation in accordance with the invention.
Figure 4:
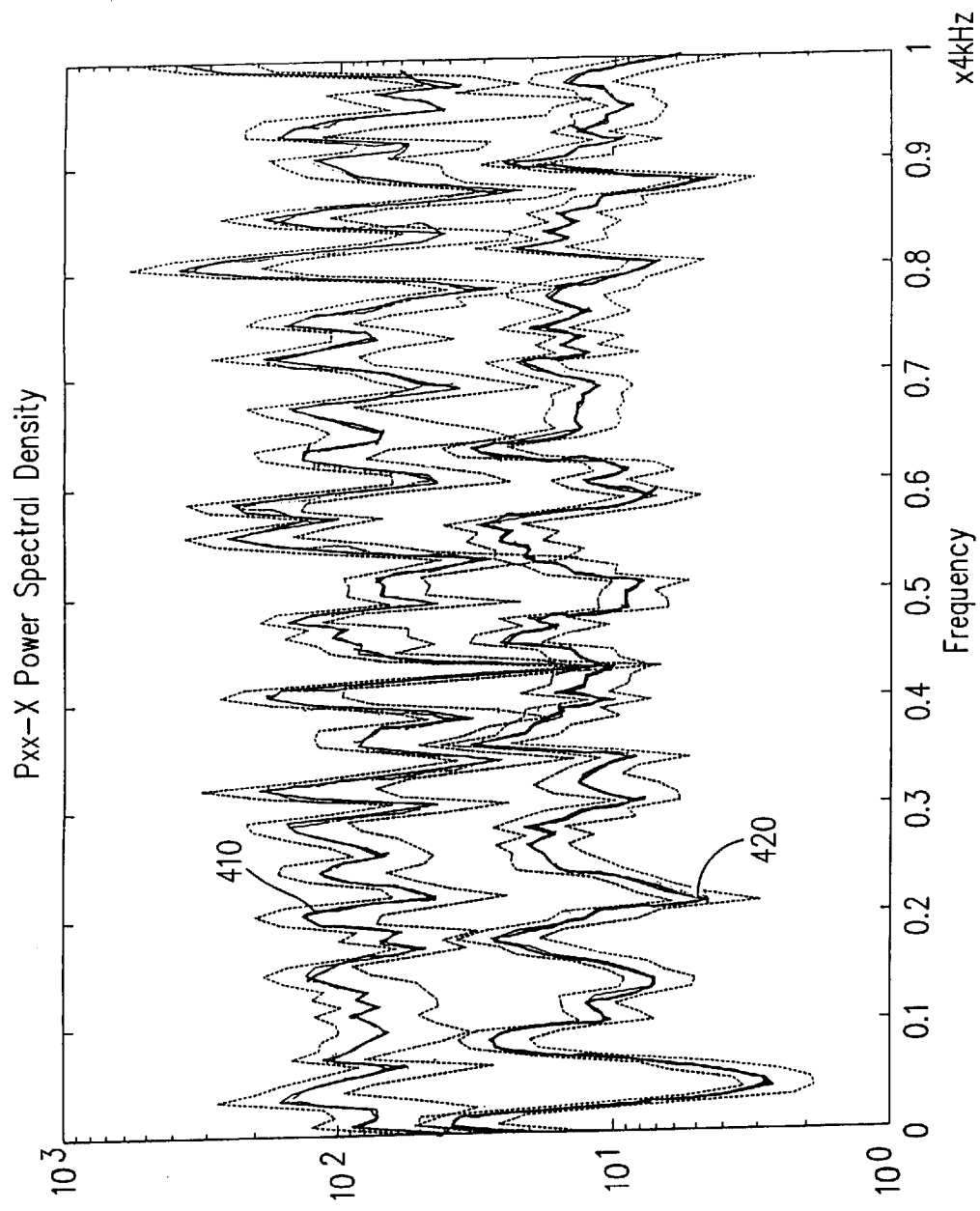

FIGS. 3 and 4 illustrate the improvement that adaptive DC compensation gives in reduction of DC wander when compared to equalization alone. In FIG. 3, a plots 310 and 320 show the power spectrums for the channel disturbance or intersymbol interference as indicated by the difference between the output samples Rx'(n) from equalizer 136 and the actual symbol levels Tx(n) for a test data stream. In plot 310, equalizer 136 includes an adaptive 150-tap filter selected for imperfections across the spectrum (0 to 4 kHz) of frequencies in the transmitted signal. Plot 320 shows the results when equalizer 136 includes a 250-tap filter. Both plots show that conventional equalizers by themselves are ineffective at removing low frequency components of the channel disturbance. In contrast FIG. 4 shows the power spectrum of uncorrected shift ΔS in a 46-kbit/s V.PCM signal when adaptive DC compensation having a 20-tap adaptive filter is used with a 150-tap equalizer (plot 410) or a 250-tap equalizer (plot 420). As shown in FIG. 4, after DC adaptive compensation, the power spectrum of the uncorrected error is relatively flat and small when compared with plots 310 and 320 of FIG. 3.

DC compensator 200 of FIG. 2 compensates for DC wander in a signal having pulse amplitude modulation. Embodiments of the invention can also compensate for DC wander in signals using other baseband modulation techniques. Signals using baseband modulation have significant low frequency components which are strongly attenuated in transmission channels.

Although the invention has been described with reference to particular embodiments, the description is only an example of the invention's application and should not be taken as a limitation. For example, although embodiments of the invention are described primarily in modems, embodiments of the invention are applicable to a variety of communication systems, not limited to modems and facsimile machines. Various other adaptations and combinations of features of the embodiments disclosed are within the scope of the invention as defined by the following claims.

Appendix

The following table contains a MatLab listing of program implementing a DC compensation process in accordance with an embodiment of the invention.

TABLE A

```
=======================================================
%This program implements a 3 tap dc compensator along with a 250 tap
%equalizer and a slicer. The input to the system is V.pcm signal.
constnum=80;
sampnum=40000;
mu1=0.00032*0.2;
tapnum=3;
C1=zeros(tapnum,sampnum/2);
E=zeros(tapnum,1);
ahat=zeros(sampnum/2+1,1);
%Declarations for equalizer eqtapnum=250;
sampnum=length(rx16)-28-50-1;
err=zeros(1,sampnum/2);
R1=[rx16(28+50+eqtapnum/2:sampnum+28+50+eqtapnum/2)'];
T=tx(1+eqtapnum/2:sampnum/2+eqtapnum/2);
%begin applying the equalizer to the rxed data for i=1:sampnum
    if mod(i,2)==0
        eqout=0;
        for j=-(eqtapnum/2-1):eqtapnum/2
            eqout=eqout+equaltap250(j+eqtapnum/2)*R1(i+eqtapnum/2-1+j);
        end;
        err(i/2)=-eqout+T(i/2);
% begin applying the dc compensator
        for j=0:(tapnum-1)
            ahat(i/2+1)=ahat(i/2+1)+C1(j+1,i/2)*E(tapnum-j);
        end;
        ahat(i/2+1)=ahat(i/2+1)+0.95*ahat(i/2);
        D=eqout+ahat(i/2+1);
% Slicing using Euclidian distance
        temptab=abs(table(1:constnum)-D);
        tabindex=find(temptab==min(temptab));
        Dhat=table(tabindex);
        Dhat=T(i/2);
% Slicing done
        ERROR=Dhat-D;
%Update the DC-compensator's taps;
        for j=0:tapnum-1
            C1(j+1,i/2+1)=C1(j+1,i/2)+mu1*ERROR*E(tapnum-j);
        end;
        for j=1:tapnum-1
            E(j)=E(J+1);
        end;
        E(tapnum)=ERROR;
    end;
end;
=======================================================
```

I claim:
1. A method for compensating for baseline wander in a signal, comprising:
   sampling the signal to generate a series of samples;
   predicting a predicted shift for a selected sample from the series of samples, wherein predicting the predicted shift comprises performing a filter operation on values derived from the samples, wherein the filter operation includes a multi-tap adaptive filter operation and a fixed filter operation for compensation of the baseline wander, and wherein the fixed filter operation is an integrator generating the predicted shift based on a previous predicted shift;
   adding the predicted shift to the selected sample to generate a corrected sample;
   determining a difference between the corrected sample and a value permitted according to a signal protocol; and
   adjusting coefficients of the multi-tap filter operation according to the difference.

2. The method of claim 1, further comprising repeating the steps of predicting, adding, determining, and adjusting for each sample in the series of samples.

3. The method of claim 2, wherein the repeated determining steps determine a series of differences, and predicting the predicted shift comprises performing the filter operation on the series of differences.

4. The method of claim 1, wherein the signal protocol includes pulse amplitude modulation which restricts levels in the signal to a discrete set of levels.

5. The method of claim 1, wherein the signal protocol includes baseband modulation.

6. The method of claim 1, wherein the fixed filter operation is an M-pole infinite impulse response integrator having fixed coefficients.

7. The method of claim 6, wherein M is equal to 1.

8. A communication device comprising:
   a converter that converts a received signal to a series of samples; and
   an adaptive DC compensation unit connected to operate on the series of samples and to adapt according to values of the samples, the DC compensation unit comprising:
      shift prediction unit that generates of a series of predicted shifts;
      a first adder that receives samples from the converter as a first addend and predicted shifts from the shift prediction unit as a second addend; and
      a slicer that processes sums from the first adder to identify symbol values according to a signal protocol, wherein
      the shift prediction unit comprises:
         a multi-tap filter having coefficients that change according to differences between the sums from the first adder and permitted amplitudes of a transmitted signal in compliance with the signal protocol; and
         an integrator that receives an integrand from the multi-tap filter, the integrator having fixed coefficients and generating the series of predicted shifts based on previous predicted shifts, the integrand and the fixed coefficients.

9. The device of claim 8, wherein the converter comprises:
   an analog-to-digital converter;
   a filter that filters a series of samples from the analog-to-digital converter; and
   an equalizer that filters a series of samples from the filter.

10. The device of claim 8, wherein:
    the analog-to-digital converter is adapted for connection to a host computer; and
    the shift prediction unit comprises software that is executable by the host computer.

11. The device of claim 8, wherein the multi-tap filter operates on the difference between the sums from the first adder and the permitted amplitudes in determining a predicted shift.

12. The device of claim 8, wherein the multi-tap filter operates on the difference between the sums from the first adder and the permitted amplitudes to generate the integrand that is input to the integrator.

13. The device of claim 8, wherein the device is a modem.

14. The device of claim 8, wherein the integrator is an M-pole infinite impulse response integrator having fixed coefficients.

15. The device of claim 14, wherein M is equal to 1.

* * * * *

UNITED STATES PATENT AND TRADEMARK OFFICE
CERTIFICATE OF CORRECTION

PATENT NO. : 6,324,232 B1
DATED : November 27, 2001
INVENTOR(S) : Khashayar Mirfakhraei It is certified that error appears in the above-identified patent and that said Letters Patent is hereby corrected as shown below:

Column 2,
Line 5, delete "fixture" and insert -- future --; and

Column 6,
Line 51, delete "of samples,".

Signed and Sealed this

Twenty-eighth Day of January, 2003

JAMES E. ROGAN
*Director of the United States Patent and Trademark Office*